March 17, 1959 — G. BERGSON — 2,878,388
GAS ANALYZING SYSTEM
Filed April 30, 1954 — 2 Sheets-Sheet 1

INVENTOR.
GUSTAV BERGSON
BY Eugene M. Whitacre
AGENT

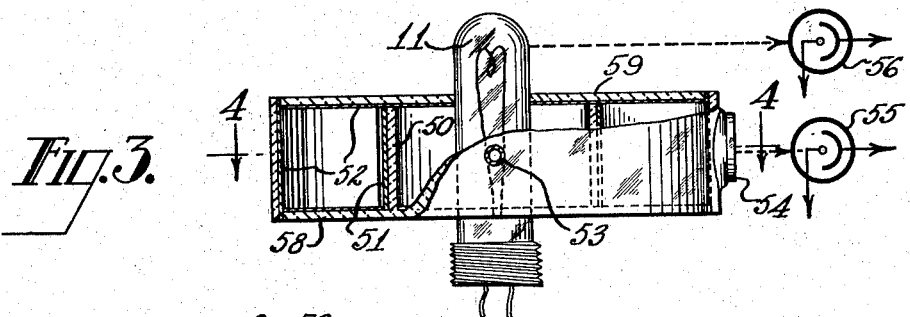
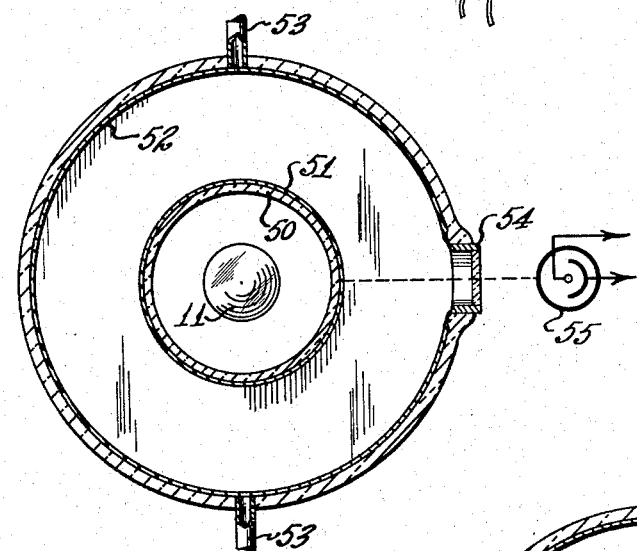
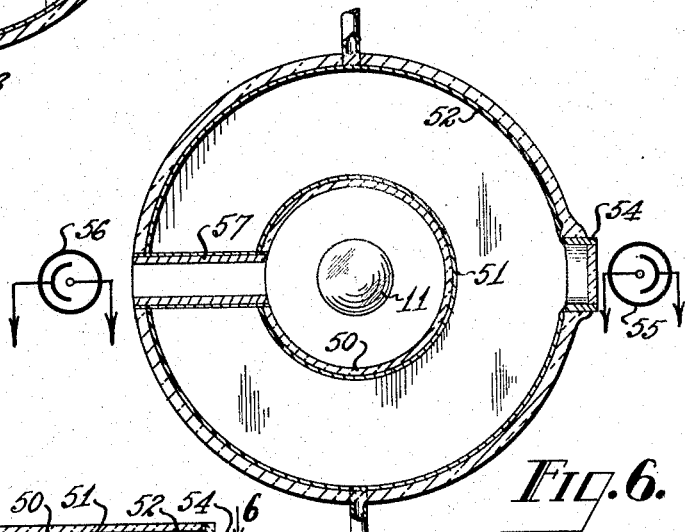
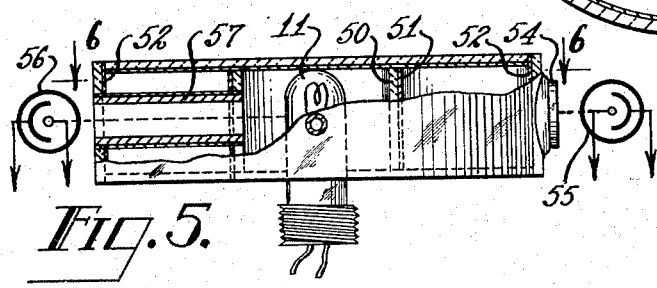

United States Patent Office 2,878,388
Patented Mar. 17, 1959

2,878,388

GAS ANALYZING SYSTEM

Gustav Bergson, Philadelphia, Pa.

Application April 30, 1954, Serial No. 426,841

4 Claims. (Cl. 250—43.5)

This invention relates to apparatus for the analysis of gas mixtures by radiant energy. More particularly, the invention relates to a system for analyzing gases by measuring the absorption of radiant energy by the gas.

It has been long recognized that certain gases have the power of absorbing energy from certain wave lengths of radiant energy. By way of example, some gases such as $CO_2$, $H_2S$, $HCN$ and $H_2O$ exhibit spectra in the infra-red region which are characterized by relatively intense absorption bands when infra-red radiations are passed therethrough. Other gases such as acetone, benzene, chlorine, ozone, etc., exhibit strong absorption spectra in the ultra violet region. In one known instrument the operation of which is based on this phenomenon, a source of radiant energy is provided, a sample of gas containing a component to be detected and having absorption spectra at the wave length of the radiations, is interposed in the path of a beam emanating from said source and directed toward a first detector in the form of a thermopile, bolometer or phototube or the like. The sample of gas is enclosed in or passed through a cell, hereinafter referred to as an absorption chamber. The absorption chamber is provided with windows for allowing the beam to pass therethrough. A second beam emanating from the source is directed toward a second detector. By comparing the differential readings of the first and second detectors, the overall absorption of the test sample may be ascertained and thereby an indication of the quantity of the component under test present in the sample may be obtained.

In practice, it has been found to be difficult to determine the presence of, or accurately measure extremely small quantities of a particular gas without resorting to elaborate and expensive systems to increase the sensitivity of the apparatus. One way in which the sensitivity of the system may be increased is by increasing the path length of the beam through the unknown sample of gas so that the gas has a longer time to absorb energy from the beam. In prior systems, the path length of the beam has been increased by providing a system of mirrors or by increasing the length of the absorption cell. Such systems are bulky or require a complicated and expensive optical system.

It is accordingly a primary object of this invention to provide an economical and compact gas analyzing system having improved sensitivity.

It is another object of this invention to provide a gas analyzing system having simple and compact structure for increasing the mean path length of radiant energy through the gas mixture under test.

A further object of this invention is to provide a simplified and highly sensitive gas analyzing system of the type which measures the absorption of radiant energy.

In accordance with the invention, partially mirrored surfaces which are capable of both transmitting and reflecting the radiant energy are used to increase the mean path length of radiant energy through a cell containing a sample of the gas to be measured. In one embodiment of the invention, a sample of the gas to be measured is placed in or passed through the absorption cell of the gas analyzing apparatus. The absorption cell is provided with a pair of windows which are positioned to allow a beam of radiant energy to be directed through the chamber, and the gas contained therein, to a detector. Each of the windows is partially mirrored to transmit a portion, and to reflect a portion of the beam incident thereon.

Radiant energy having wave lengths in that portion of the spectrum in which the gas is known to exhibit absorptive power is focused on one of the windows of the absorption cell. A portion of the beam of radiant energy is transmitted into the cell and the remainder is reflected from the partially mirrored window. That portion of the beam which is admitted to the cell is reflected back and forth between the partially mirrored windows with some of the beam escaping through one or the other of the windows with each reflection. The mean path length of the beam travelling through the gas in the absorption chamber is found to be greatly increased by the use of partially mirrored windows in accordance with the invention. It was further found that the operation of gas analyzing equipment using this arrangement evidenced a superior sensitivity in detecting the presence of certain gases.

Accordingly, another object of this invention is to provide an improved absorption chamber having simple and efficient construction for increasing the path length of radiant energy therethrough.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 3 is a side view partly broken away to show certain constructional details of a modification of the absorption chamber embodying the invention;

Figure 4 is a sectional view taken on the lines 4—4 of the absorption chamber shown in Figure 3;

Figure 5 is a side view partly broken away to show certain constructional details of another modification of the absorption chamber shown in Figure 3 and constructed in accordance with the invention; and Figure 6 is a sectional view taken on the lines 6—6 of the absorption chamber shown in Figure 5.

Figure 1:
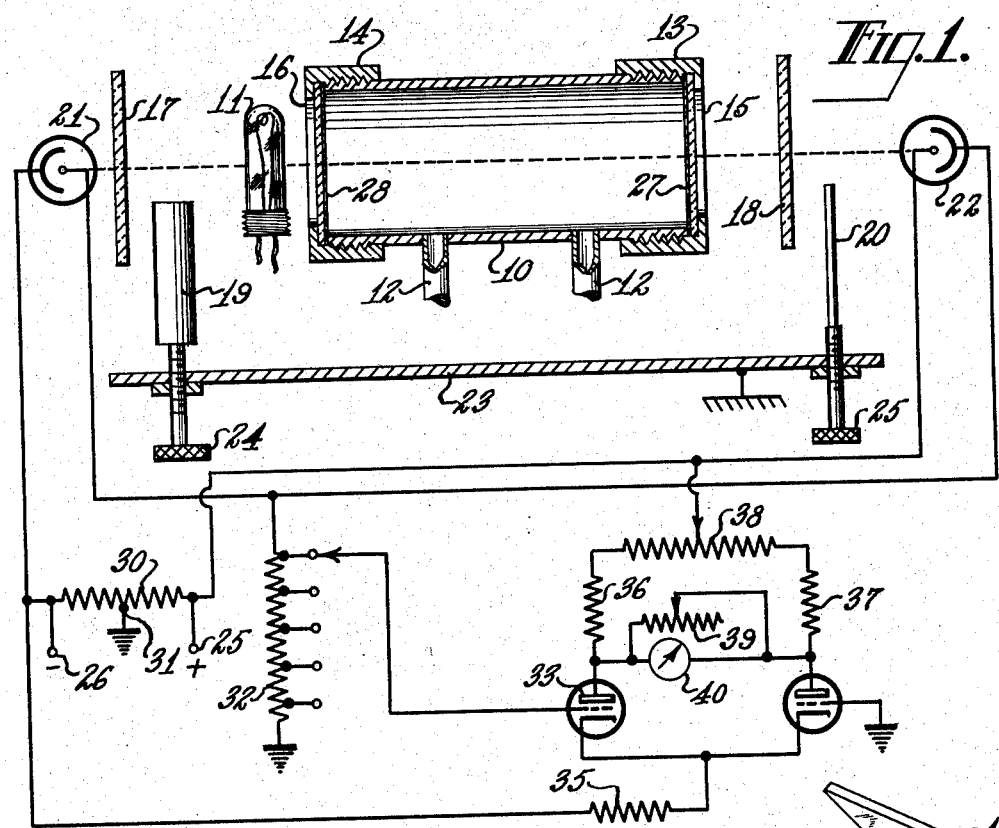
Figure 1 is a diagrammatic longitudinal sectional view of one form of gas analyzing apparatus embodying an absorption cell constructed in accordance with the invention, and also shows a schematic circuit diagram of an electrical indicating circuit.

Referring now to the drawings and particularly to Figure 1, a sample of the gas to be tested is admitted into an absorption chamber 10 through a pair of inlet pipes 12. If desired, the gas under test may be continuously passed through the absorption chamber 10. The absorption chamber 10 shown in this embodiment of the invention has a cylindrical body portion with the opposite ends thereof closed by the windows 15 and 16. The windows 15 and 16 are tightly sealed with appropriate gaskets to the cylindrical body portion by any suitable fastening device such as a pair of screw-on caps 13 and 14.

A source of radiations 11 which by way of example may be a source of ultra violet radiations such as a G4T4 lamp, is positioned adjacent the window 16 for directing radiant energy into the absorption chamber. The windows 15 and 16 are made of a material such as vycor or the like which is easily permeable by the radiant energy from the source 11. A thin film of a highly reflective material 27 and 28 such as aluminum or the like, is applied to each of the windows 15 and 16 in such a thickness that the beam of radiant energy from the source 11 incident thereon is partially reflected from the surface and also partially transmitted through the surface into the absorption chamber 10. It is understood that any means may be used to provide the partially reflective-partially transmitting windows, the above being described only by way of example, and not as a limitation of the invention.

The portion of the beam admitted into the absorption cell 10 travels through the gas therein and impinges on the reflective surface of the window 15. The partially mirrored surface of the window 15 allows a portion of the beam incident thereon to pass therethrough to the detection device or phototube 22. The remainder of the beam is reflected back through the gas to the window 16 where the same process is repeated, and so on ad infinitum.

Each time the beam impinges upon the window 15 a portion is transmitted therethrough to form a component of the resultant beam which passes to the detector. The net effect is to provide an increased effective mean path length of the beam through the gas, hence increasing the absorption of energy from the beam, for a given amount of gas under test.

The process may be better understood from the following mathematical analysis:

Let $I_0$ = the total incident radiation on the window 16.

Let $I_L$ = the aggregate emerging radiation from the window 15.

$R_1$, $T_1$, $R_2$ and $T_2$ = the reflectance and transmittance respectively of the partially mirrored surfaces 28 and 27.

$T_c^{1/2}$ = the fractional transmittance of the gas in the absorption chamber between the windows.

Then $$I_L = I_0 T_1 T_2 T_c^{1/2}[1 + T_c R_1 R_2 + T_c^2 R_1^2 R_2^2 + \ldots T_c^n R_1^n R_2^n]$$

This represents each of the components of the beam emerging from the window 15 from the successive impinging of the beam thereon. Collecting the terms:

$$I_L = I_0 T_1 T_2 T_c^{1/2} \frac{1}{1 - T_c R_1 R_2}$$

If $R_1 \ll 1$ and $R_2 \ll 1$ which would be the case with substantially no reflectance of the beam.

Then $$I_L \doteq I_0 T_1 T_2 T_c^{1/2}$$

$\doteq$ means approximately $$I_{Lo} = I_0 T_1 T_2$$

$I_{Lo} = I_L$ for $T_c = 1$ $$\Delta_1 = \frac{I_{Lo} - I_L}{I_{Lo}}$$

substituting for $I_L$ and $I_{Lo}$ above $$\Delta_1 = 1 - T_c^{1/2}$$

= fractional change in $I_L$ due to $T_c$

Condition 2: $R_1 \doteq 1$ $R_2 \doteq 1$ $$I_L = \frac{I_0 T_1 T_2 T_c^{1/2}}{1 - T_c R_1 R_2}$$

$$I_{Lo} \doteq \frac{I_0 T_1 T_2}{1 - R_1 R_2}$$

= $I_{Lo} = I_L$ for $T_c = 1$ $$\Delta_2 = \frac{I_{Lo} - I_L}{I_{Lo}}$$

substituting for $I_L$ and $I_{Lo}$ above.

$$\Delta_2 = (1 - T_c^{1/2}) \frac{1 + R_1 R_2 T_c^{1/2}}{1 - R_1 R_2 T_c}$$

= fractional change in $I_L$ due to $T_c$

The increase in sensitivity due to the increased reflectance is then shown by the equation below:

$$\frac{\Delta_2}{\Delta_1} = \frac{1 + R_1 R_2 T_c^{1/2}}{1 - R_1 R_2 T_c}$$

$$\frac{\Delta_2}{\Delta_1} \doteq \frac{1 + R_1 R_2}{1 - R_1 R_2} \text{ for } T_c \doteq 1$$

for $T_c \doteq 1$

Thus if the reflectance of the windows 15 and 16 is .9, that is if 90% of the radiation incident thereon is reflected, then $$\frac{\Delta_2}{\Delta_1} = \frac{1 + 0.81}{0.19} > 9$$

Thus by making the windows reflect 90% of the radiation a greater than ninefold increase in the fractional change in light may be realized over a system not having the reflective surfaces.

The composite beam emerging from the window 16 is passed through an optical filter 18 which cuts out those wave lengths of the radiant energy least affected by the gas under test. It is not essential that a filter be used, but it is desirable in certain applications such as when measuring minute quantities of a given gas, since the filter passes only those wave lengths which are most absorbed by the gas to the detector 22.

A shutter 20 is adjustably disposed between the filter 18 and the phototube 22. The shutter as shown here is simply a small rod which is selectively moved into the beam path to control the amount of energy reaching the phototube whereby the measuring system may be balanced as will hereinafter be explained.

The position of the shutter 20 may be adjusted by a knob 25 located on the front panel 23 of the gas analyzer. A second beam of radiation from the source 11 is directed through an optical filter 17, which is similar to the filter 18, to a phototube 21. The amount of energy reaching the phototube 21 is controlled by a shutter 19 which in turn is controlled by a knob 24 located on the front panel 23 of the analyzer. The photoelectric tubes 21 and 22, which are shown by way of example, may be replaced by any radiation sensitive detector such as a bolometer or thermopile.

A source of polarizing potential, not shown, is connected with a pair of terminals 25 and 26. A voltage dividing resistor 30, which has a grounded center tap 31, is connected between the terminals 25 and 26. The phototubes 21 and 22 are connected across respective halves of the resistor 30 through a common current return resistor 32.

The resistor 32 is provided with a series of taps which may be selectively connected with the control electrode of an amplifier tube 33. If desired, a continuously variable resistor could be used in place of the step-by-step type adjustment shown. The measuring circuit includes a pair of electron tubes 33 and 34 which are connected in parallel. The cathodes of the tubes 33 and 34 are directly connected together and have a common cathode bias resistor 35 which is connected to the negative terminal 26 of the power supply. The anodes of the tubes 33 and 34 are connected through the load resistors 36 and 37 respectively to opposite ends of a variable resistor 38. The variable tap on the resistor 38 is connected with the positive terminal 25 of the power source. By varying the position of the tap the relative anode potentials of the tubes 33 and 34 are varied and the conduction of the tubes may be balanced.

A meter 40 is connected directly between the anodes of the electron tubes 33 and 34 to measure the difference in anode potential between the two tubes. A variable resistor 39 serves as a meter shunt to provide the proper meter ranges.

Under reference conditions the shutters 19 and 20 are adjusted to balance the current in the phototubes 21 and 22 and, hence provide minimum current flow through the resistor 32. If a gas is then introduced into the absorption chamber 10 which absorbs some of the beam, the phototube 22 conducts less than phototube 21 causing an unbalance. When such an unbalance exists current flows in the resistor 32 to develop a potential representative of the degree of unbalance.

The potential across the resistor 32 is directly connected to the grid of the tube 33 and is of such a polarity to reduce the current flow in that tube. Hence, the anode potential of the tube 33 is increased and the anode potential of the tube 34 is descreased since the common cathode bias across the resistor 35 is reduced as a result of the smaller current through the tube 33. The difference in anode potential is indicated on the meter 40 which may be calibrated to read directly the quantity of gas present.

The indicating system and detection system described are shown and described only by way of example, and the optical system embodying the invention may be used with any gas analyzers requiring an absorption cell of the type described.

Figure 2:
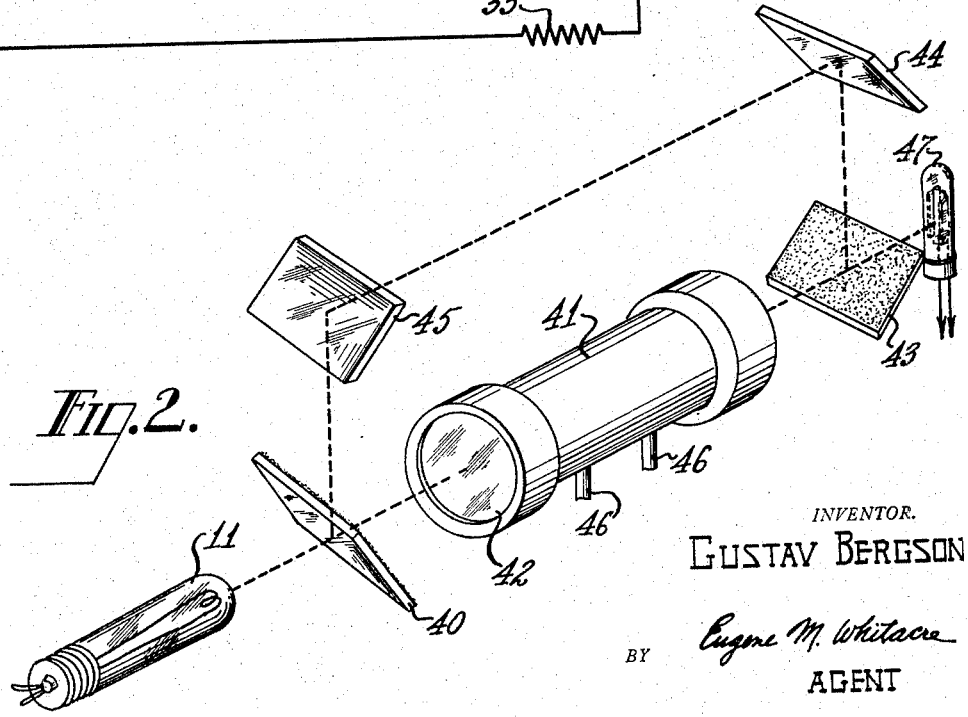
Figure 2 is a diagrammatic perspective view of a modification of the gas analyzing apparatus shown in Figure 1.

Referring now to Figure 2, a source of radiations 11 which have a wave length that is absorbed by a gas to be tested, is positioned adjacent a partially mirrored window 40 for directing radiant energy therethrough into an absorption chamber 41. As described above, part of the radiant energy incident on the partially mirrored window is reflected and the remainder transmitted therethrough. The absorption chamber 41 is of an elongated tubular construction having the opposite ends thereof sealed by a pair of radiation permeable windows 42 one of which is disposed at each end of the chamber. The gas under test is admitted to the absorption chamber by means of the inlet pipes 46.

A second partially mirrored window 43 is positioned in the path of the radiations passing from the absorption chamber 41 and is so disposed that the portion of the radiations reflected therefrom are directed to a mirror 44. The radiations which pass through the partially mirrored window 43 impinge upon the cathode of a phototube 47 which is connected with an indicating means.

The radiations reflected from the mirror 44 are directed to a mirror 45 and back to the partially mirrored window 40. Part of the radiant energy from the mirror 45 passes through the partially mirrored window and is lost. The reflected portion, however, is again passed through the absorption chamber 41 and the gas contained therein, and impinges on the partially mirrored surface 43 where the reflection process is repeated again and so on ad infinitum as explained above in connection with Figure 1. It is understood that, if desired, the partially mirrored window 43 and the detector 45 could be interchanged with either of the windows 44 or 45.

Referring now to Figures 3 and 4 which disclose a further embodiment of the invention, a source of radiant energy 11 having a wave length which can be absorbed by the gas under test, is positioned along the axis of a toroidal or doughnut shaped absorption chamber. The inner wall 50 of the absorption chamber is comprised of a radiation permeable material and is provided with a partially mirrored surface 51. The outer wall 52 and the end plates 58 and 59 of the absorption chamber have mirrored surfaces to reflect all the radiant energy incident thereon. A pair of inlet pipes 53 are provided as a means for admitting the unknown gas into the absorption chamber or as mentioned above, the gas may be continuously passed therethrough.

A beam from the source 11 is admitted through the partially mirrored surface 51 into the absorption chamber and is reflected through the absorption chamber until a portion of it finally emerges from the window 54.

It has been found that an absorption chamber constructed in accordance with this embodiment of the invention provides a mean path length much greater in distance than the mean circumference of the chamber. The sensitivity of such a device also is greatly increased by the fact that the absorption cell surrounds the source, hence, the radiation emanating from the source 11, which is reflected back from the partially mirrored surface 51, again impinges on the surface 51 at a different point and, therefore, a greater composite amount of radiation from the source is admitted into the chamber to be absorbed by the gas.

The radiation escaping through the window 54 impinges on a phototube 55 or other detection device which is connected with the suitable indicating means. As can be seen in Figure 3, the source 11 projects from the top of the absorption chamber and a reference beam from the portion of the source 11 above the top of the chamber is directed to the cathode of a reference phototube or detection device 56 which may be connected in circuit with the phototube 55 in a similar manner to that of the phototubes shown in Figure 1.

Referring to Figures 5 and 6, there is shown an embodiment of the absorption chamber shown in Figures 3 and 4, in which the source 11 may be completely enclosed within the center portion of the absorption chamber structure. This embodiment is substantially the same as that described above except that a passageway defined by a tubular connecting pipe 57 is provided between the inner and outer walls of the absorption chamber for providing a direct path of radiation from the source 11 to the reference detector 56. Otherwise the structure of the absorption chamber is similar to that described with reference to Figures 3 and 4.

There has been described in accordance with the invention, a gas analyzing system having simple and compact means for increasing the mean path length of radiant energy through a gas sample under test. This equipment includes an improved optical system having partially mirrored windows associated with the absorption chamber for reflecting radiations back and forth therethrough.

What is claimed is:

1. In a gas analyzer of the type which measures the absorption of radiant energy by a gas of interest, the combination comprising a source of radiant energy, an absorption chamber for containing a sample of the gas to be analyzed, means directing radiant energy from said source through said absorption chamber, detection means disposed for energization by radiant energy passing from said chamber, means providing a radiation permeable surface disposed in the path of the radiant energy entering said chamber, said radiation permeable surface being uniformly coated with a reflective material adapted to permit partial transmission and partial reflection of radiant energy incident on said coating, and means disposed in the path of the radiant energy between said radiation permeable surface and said detection means for reflecting at least some of the radiant energy back to said radiation permeable surface.

2. In a gas analyzing system of the type which measures the absorption of radiant energy by a gas of interest, a source of radiant energy, a first and a second detecting means energized by said radiant energy, an absorption cell for enclosing gas of interest disposed in the path of the radiant energy between said source and said first detection means, means providing a radiation permeable surface disposed in the path of the radiant energy entering said cell, said radiation permeable surface being uniformly coated with a reflective material of an optical density to reflect at least half the radiant energy incident thereon and to transmit the unreflected portion of said radiant energy therethrough, and means disposed in the path of the radiant energy between said radiation permeable surface and said detection means for reflecting at least some of the radiant energy back to said radiation permeable surface whereby the effective mean path length of the radiant energy through said chamber is increased, means energized by said first and second detecting means for comparing the relative energization thereof by said radiant energy, and means for indicating the relative absorption of said radiant energy by the gas of interest.

3. In a gas analyzing system of the type which measures the absorption of radiant energy by a gas of interest, a source of radiant energy, an absorption chamber surrounding said source, said chamber having inner and outer walls, at least a part of the inner cylindrical wall of said chamber being permeable to said radiant energy for admitting radiations from said source into said chamber, means providing a radiation permeable surface on at least a part of said inner wall, said radiation permeable surface being uniformly coated with a reflective material adapted to permit transmission and partial reflection of radiant energy incident on said coating, further means providing a mirrored surface on at least a part of the other walls of said chamber, means providing an exit window permeable to said radiant energy in said outer wall, and detection means positioned adjacent said exit window.

4. In a gas analyzer of the type which measures the absorption of radiant energy by a gas of interest, the combination comprising a source of radiant energy, an absorption chamber for containing a sample of the gas to be analyzed, means directing radiant energy from said source through said absorption chamber, detection means disposed for energization by radiant energy passing from said chamber, means providing a radiation permeable surface disposed in the path of the radiant energy entering said chamber, said radiation permeable surface being of the type adapted to reflect at least half of the radiation incident thereon and transmit at least a portion of the remainder of the radiation therethrough, and means disposed in the path of the radiant energy between said radiation permeable surface and said detection means for reflecting at least some of the radiant energy back to said radiation permeable surface.

References Cited in the file of this patent
UNITED STATES PATENTS

| | | |
|---|---|---|
| 2,212,211 | Pfund | Aug. 20, 1940 |
| 2,697,789 | Skarstrom | Dec. 21, 1954 |
| 2,703,844 | Miller | Mar. 8, 1955 |
| 2,761,067 | Troy | Aug. 28, 1956 |